United States Patent [19]
Golding

[11] Patent Number: 5,365,667
[45] Date of Patent: Nov. 22, 1994

[54] TOOL INSPECTION APPARATUS HAVING MOVABLE MICROSCOPE FOR VIEWING DIFFERENT PORTIONS OF A TOOL

[76] Inventor: David L. Golding, R.R. 3-11 137 St. Rte. 15, Montpelier, Ohio 43543

[21] Appl. No.: 162,829

[22] Filed: Dec. 7, 1993

[51] Int. Cl.⁵ .................................... G01B 11/26
[52] U.S. Cl. ............................ 33/201; 33/628; 33/534; 356/397
[58] Field of Search ............ 33/199 R, 199 B, 201, 33/626, 628, 636, 639, 549, 286, 832, 537, 276, 534; 356/390, 395, 397; 359/391

[56] References Cited

U.S. PATENT DOCUMENTS

| | | | |
|---|---|---|---|
| 1,489,372 | 4/1924 | Steinle | 23/201 |
| 1,727,875 | 9/1929 | Gallasch | 356/390 |
| 2,608,767 | 9/1952 | Hall | 33/201 |
| 2,648,138 | 8/1953 | Gase | 33/201 |
| 2,794,362 | 6/1957 | Yale | 33/201 |
| 2,990,740 | 7/1961 | Johnson | 33/628 |
| 3,231,982 | 2/1966 | Ribich | 33/201 |
| 3,676,935 | 7/1972 | Klausing | 33/201 |
| 4,303,299 | 12/1981 | Clark | 359/391 |
| 4,559,712 | 2/1985 | Kubetin | 33/201 |
| 4,662,075 | 5/1987 | Mastel et al. | 33/628 |
| 5,105,545 | 4/1992 | Fletcher | 33/201 |
| 5,155,556 | 10/1992 | Foanio | 33/201 |

FOREIGN PATENT DOCUMENTS

| | | | |
|---|---|---|---|
| 745950 | 5/1943 | Germany | 33/201 |
| 260915 | 5/1970 | U.S.S.R. | 33/201 |
| 693104 | 10/1979 | U.S.S.R. | 33/201 |

Primary Examiner—William A. Cuchlinski, Jr.
Assistant Examiner—G. Bradley Bennett
Attorney, Agent, or Firm—Shlesinger Arkwright & Garvey

[57] ABSTRACT

Tool inspection apparatus includes a bed configured for supporting a tool to be inspected, and a magnifying device associated with the bed for focusing on and magnifying at least a portion of a tool supported by the bed. There is also a reflecting member associated with the bed for reflecting an image of a portion of the tool supported on the bed toward the magnifying device. The magnifying device is movable from a position in which it receives an image of a portion of the tool reflected by the prism to a direct image-receiving position in which the magnifying device directly receives and magnifies a portion of a tool supported on the bed.

15 Claims, 2 Drawing Sheets

TOOL INSPECTION APPARATUS HAVING MOVABLE MICROSCOPE FOR VIEWING DIFFERENT PORTIONS OF A TOOL

FIELD OF THE INVENTION

This invention relates to a magnifying inspection device such as a tool inspection device. It should be understood that the inventive inspection device can be used for viewing portions of tools, components, workpieces, and many other objects.

BACKGROUND OF THE INVENTION

Inspection devices, such as for inspecting portions of tools and the like, are generally known.

Such known inspection devices usually include elements for clamping a tool to be inspected, as well as a magnifying portion, such as a microscope, for focusing on the portion of the tool to be inspected.

However, there is still a need for an inspection device which overcomes the drawbacks of conventional inspection units which are relatively expensive, complicated to manufacture, fail to optimize the use of components by fully exploiting the physical characteristics of the different components, and which are unwieldy, bulky, and difficult to use.

Accordingly, there is a need for an inspection device which overcomes these above-mentioned drawbacks.

U.S. Pat. No. 3,231,982 to Ribich discloses an optical magnification means having a vertical portion and a horizontal portion. A mirror is mounted at a 45° angle between the vertical portion and the horizontal portion so that the user can observe a tool at the end of a guideway. A second magnification means is provided and oriented at an angle such that the light source and the area focused in upon by the magnification means meet at the same place, such as the area of the cutting edge of a tool being observed. Ribich recognized the use of a mirror for reflecting an image to the user's eye at a more convenient position; however, Ribich still used two separate optical magnification means for inspecting the sides and ends of the a tool, respectively.

U.S. Pat. No. 4,662,075 to Mastel et al. shows a groove designed for receiving a knife or a knife blade holder. A microscope is used to focus on a portion of the knife being inspected.

U.S. Pat. No. 5,105,545 to Fletcher discloses a device for inspecting a tool, such as an end mill held by a work holder slidably and movably guided along a guide track. A hand screw may be tightened to prevent inadvertent movement of Fletcher work holder when end mill is to be inspected by a microscope.

U.S. Pat. No. 4,303,299 to Clark shows a hand-held instrument for inspecting drill bits in which a drill bit is inserted into a bushing for inspecting a drill bit by use of a microscope disposed vertically above the drill bit. In order to inspect the side of the drill bit, the drill bit must be removed from bushing and reinserted into a second bushing which extends substantially horizontally and is oriented transversely to vertically extending bushing.

The term "tool" as used throughout the description is for convenience only, given that all types of tools, workpieces, and components can be studied by the inspection device according to the invention.

OBJECTS AND SUMMARY OF THE INVENTION

It is a first object of the invention is to provide an inspection apparatus which overcomes the drawbacks of existing devices.

Another object of the invention is to provide an inspection apparatus which is simpler and more economical to fabricate and to use than existing devices.

Yet another object of the invention is to provide a tool inspection device in which a single magnifying device can be used for inspecting both the ends and the sides of a tool to be inspected.

A still further object of the invention is to provide an inspection device which has fewer moving parts and, hence, is more reliable than existing devices.

Another object of the invention is to provide an inspection device which fully exploits the physical properties of the components from which it is made.

Yet another object of the invention is to provide an inspection device which is self-compensating.

A further object of the invention is to provide an inspection device which can be used for determining both angular measurements and for determining linear measurements.

Yet another object of the invention is to provide an inspection device having compact dimensions and portability which allows on-site use, such as for receiving inspection, grinding room inspection, or production area inspection to determine tool geometry and dimensions.

Another object of the invention is to provide an inspection device which provides a real view system allowing viewing of many features of an object being inspected that cannot be seen on a shadow graph nor on an optical comparator.

A still further object of the invention is to provide a tool inspection device in which the optics are mounted directly on a caliper for enhancing accuracy by eliminating the use of linkages or slides.

Yet another object of the invention is to provide an attachment between a caliper and the magnifying device or optics so that a universal mounting is provided by which defective calipers can be easily replaced.

Another object of the invention is to provide a inspection unit which is sized so that it can be stored in the top compartment of the typical machinist's tool box.

In summary, therefore, the invention is directed to a tool inspection apparatus which includes a bed configured for supporting a tool to be inspected, and a magnifying device associated with the bed for focusing on and magnifying at least a portion of a tool supported by the bed. There is also a reflecting member associated with the bed for reflecting an image of a portion of the tool supported on the bed toward the magnifying device. The magnifying device is movable from a position in which it receives an image of a portion of the tool reflected by the prism to a direct image-receiving position in which the magnifying device directly receives and magnifies a portion of a tool supported on the bed.

The invention will be further described with reference to the following drawings.

DETAILED DESCRIPTION OF THE INVENTION

Figure 1:
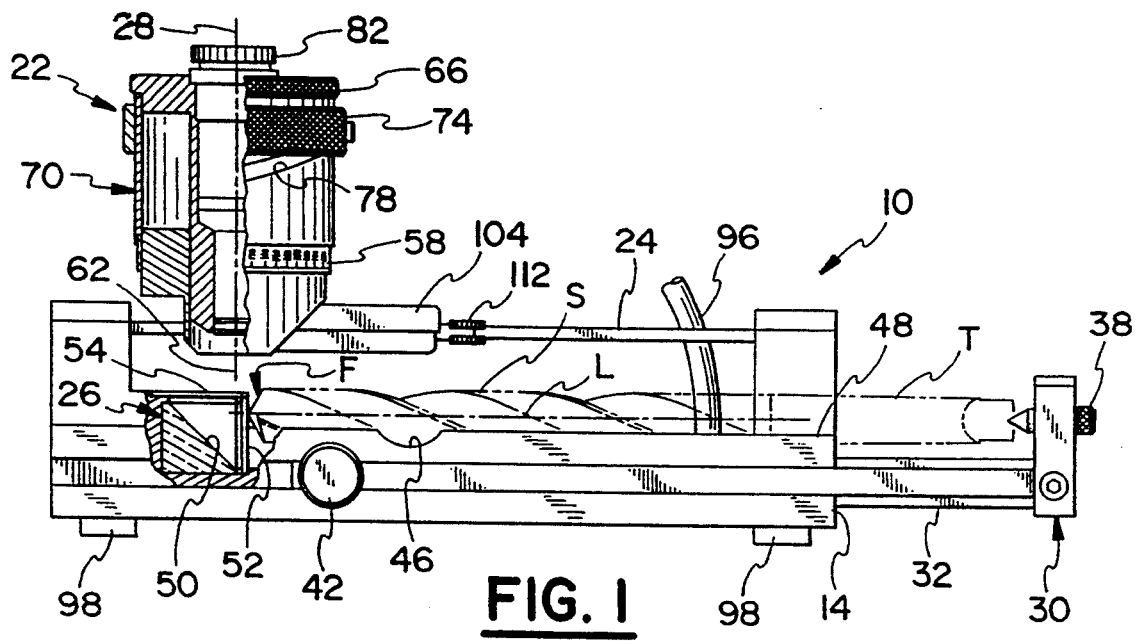
FIG. 1 is a front, side elevational view of a first preferred embodiment of a tool inspection apparatus according to the invention.
Figure 2:
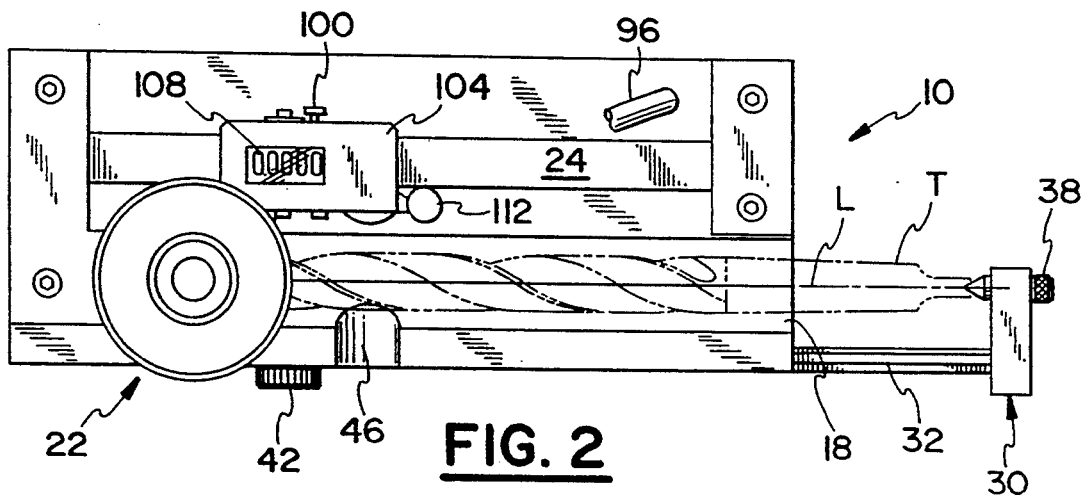
FIG. 2 is a top plan view, partially in section, of the tool inspection apparatus of FIG. 1.
Figure 3:
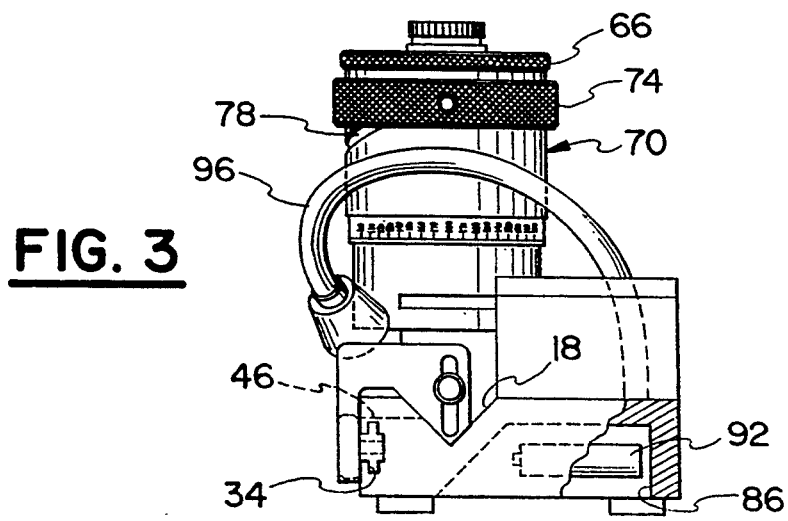
FIG. 3 is an end view of the tool inspection apparatus of FIG. 1.

FIGS. 1-3 illustrate a tool inspection apparatus 10 according to one of the preferred embodiments of the invention.

Tool inspection apparatus 10 includes a bed 14 in which an elongated restraining means 18, such as a V-shaped groove is defined for receiving and stabilizing a tool T to be inspected.

A magnifying device 22, such as a microscope, is associated with bed 14 for inspecting all parts of a tool T received thereon. Preferably, magnifying device 22 is movable relative to a guide rail 24, as will be described in greater detail below.

A reflecting member 26 is preferably located at one end of bed 14. Reflecting member 26 enables a user to view a free end F of a tool T when a longitudinal axis 28 of microscope 22 is oriented transversely to a longitudinal axis L of a tool T received in the groove 18. Goods results have been achieved when reflecting member 26 as been fabricated as a prism or as a conventional mirror. It is likewise contemplated that other reflective surfaces will be used.

To assist in stabilizing a tool T to be inspected, a sliding tailstock 30 is preferably provided that has a sliding tailstock bar 32 received in a slot 34 defined in bed 14. An adjustment screw 38 can be provided for engaging an end of a tool T. Likewise, a tailstock lock screw 42 for preventing movement of sliding tailstock bar 32 relative to bed 14 may be provided.

A transverse groove 46 extends outwardly from the groove 18. Transverse groove 46 enhances access of a user's finger to a tool T received in V-groove 18, especially if the tool T is small and has a side S located below a top free edge 48 of the V-groove 18. The illustrated tool T has a side 8 which extends well above top free edge 48.

A reflective surface 50 of reflecting member 26 reflects the image of free end F of tool T toward magnifying device 22. Preferably, magnifying device 22 includes a substantially vertical side window 52 and a substantially horizontal top window 54 for preventing contact between free end F of tool T and reflective surface 50. Windows 52 and 54 likewise serve to keep reflective surface 50 dust-free, fingerprint-free, and scratch-free to ensure that the reflective properties thereof are maintained.

A graduated scale 58 for assisting in the determination of angular measurements is provided on magnifying device 22.

A reference line or "zeroing" point 62 is provided near graduated scale 58 for establishing a starting point for measuring angles.

A graduated scale collar 66 provided for magnifying device 22 causes graduated scale 58 to rotate when graduated scale collar 66 is turned.

An object focus 70 includes an object focus collar 74 associated therewith, as well as an object focus spiral 78 along which gross and fine focusing movement occurs.

A reticle focus 82 is preferably included on magnifying device 22 to allow focusing of a reticle, as required. The reticle serves as a base line from which the majority of the angular and linear measurements of tool T are performed. The use and function of the reticle will be described in greater detail below under the description of the operation of the invention.

A cavity 86 may be provided in bed 14 to both reduce the weight of inspection apparatus 10 and to serve as a compartment in which a battery 92 may be disposed for powering a lamp 96.

Another preferred embodiment is provided with a plurality of feet 98, which may be made of rubber, and which serve to further stabilize bed 14 on a support surface.

A linear measurement device or caliper 104 is movably mounted on rail 24. Preferably, a thumb wheel 112 provided on linear measurement device 104 is rotatably attached and allows a user to advance and retreat linear measurement device 104 along rail 24 by rotation thereof. Preferably, caliper 104 has a standard reset button 106 and a digital readout 108. Given that microscope 22 is substantially directly connected to caliper 104 for movement therewith, inspection device 10 is self compensating, even though a preferred material for many of the components is aluminum.

OPERATION

Figure 4:
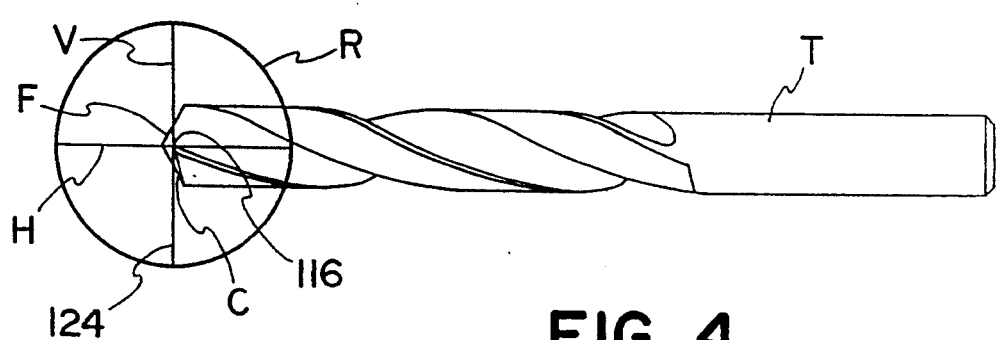
FIG. 4 is a schematic view of a drill bit and a reticle according to the invention when the reticle has been zeroed for initiating a lip clearance angle measurement, for example.
Figure 5:
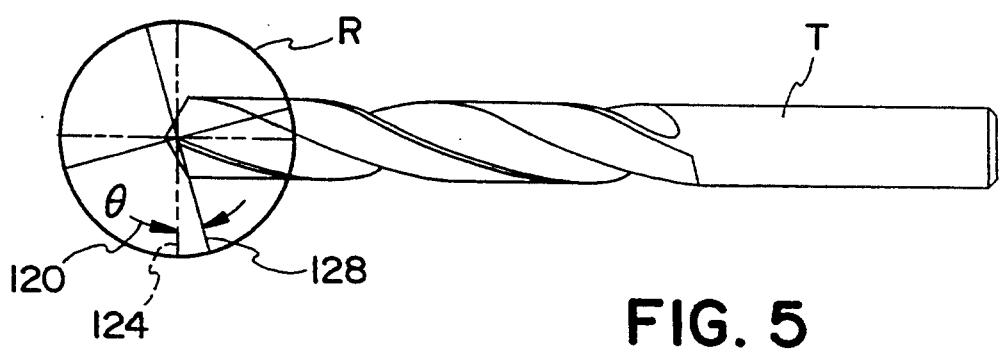
FIG. 5 is a schematic view of the drill bit of FIG. 4 illustrating how the rotated reticle cross hair corresponds to the measured lip clearance angle $\theta$.

Turning to FIGS. 4 and 5, the operation of the tool inspection apparatus 10 according to the invention will be first described as inspection apparatus 10 is used for determining a lip clearance angle $\theta$ (theta).

FIG. 4 schematically illustrates tool T as it is restrained for inspection by inspection apparatus 10. The user will typically look through an eye piece of reticle focus 82 and see in his or her field of vision a magnified field including a reticle R, such field including a vertical cross hair V and a horizontal cross hair H. The terms "vertical" and "horizontal" are for reference purposes, as such are rotated when angular measurements are made. A reference line or starting position 124 of vertical cross hair V serves as a baseline for the angular measurement determining lip clearance angle $\theta$.

Thus, to determine lip clearance angle $\theta$ one places tool T in V-groove 18 so that free end abuts or is located adjacent to vertical side window 52, as shown in FIG. 1. For convenience, tool T will be placed so that the cutting lip thereof is facing up; i.e., facing in the direction of magnifying device 22.

The user then zeroes the graduated scale 58, that is, the user turns graduated scale collar 66, or graduated scale 58 which will turn graduated scale collar 66, and zeroes the scale. Namely, the reference numbers corresponding to angular measurements on graduated scale 58 will be aligned with reference line 62.

One then grasps graduated scale collar 66 to retain graduated scale 58 in its zeroed position and turns focusing collar 74 until tool T is in focus.

Tool T is then rotated until its cutting edge is aligned with horizontal cross hair H. The user now rotates thumb wheel 112 causing linear measurement device 104 to move along rail 24 until vertical cross hair V is likewise at the front corner 116 of the cutting edge; namely, the intersection of vertical cross hair V and horizontal cross hair are at front corner 116 of the cutting edge C of tool T. This is the position as shown in FIG. 4.

FIG. 5 shows the final position of vertical cross hair V and horizontal cross hair when measuring a lip clearance angle 120; namely, lip clearance angle 8. The user has gone from the appearance of reticle R and free end of tool T shown in FIG. 4 to that shown in FIG. 5 by looking through magnifying device 22 and rotating graduated scale collar 66 until a starting position 124 of reference line has been relocated to a moved position 128. Moved position 128 corresponds to the rotated vertical cross hair V being aligned with cutting edge C of tool T. The reading on graduated scale 58 corresponds to lip clearance angle θ. In other words, the reference number on graduated scale 58 which is aligned with reference line 62 corresponds to the lip clearance angle designated 120. Of course, if no reference number is directly aligned with reference line 62, then the user interpolates between the two closest reference numbers as is well known.

Figure 6:
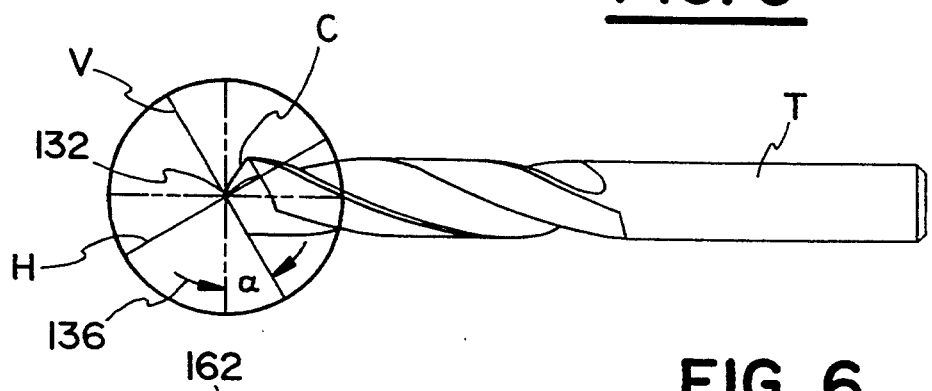
FIG. 6 schematically illustrates the cross hairs of the reticle according to the invention aligned with a cutting edge of a drill bit for determining the point angle thereof, for example.

FIG. 6 schematically illustrates the manner in which a point angle α (alpha) is measured by the user of inspection apparatus 10 according to the invention.

The user places tool T in position as generally described above, orienting a cutting edge C of the illustrated drill bit T so that substantially the entire cutting edge is facing up. The user then places the intersection of vertical cross hair V and horizontal cross hair H on top of a drill point 132. Graduated scale 58 is zeroed, then rotated from its position extending substantially perpendicularly to the longitudinal axis of tool T to a moved position aligned with the cutting edge. Swept out angle 136 corresponds to point angle α (alpha).

Figure 7:
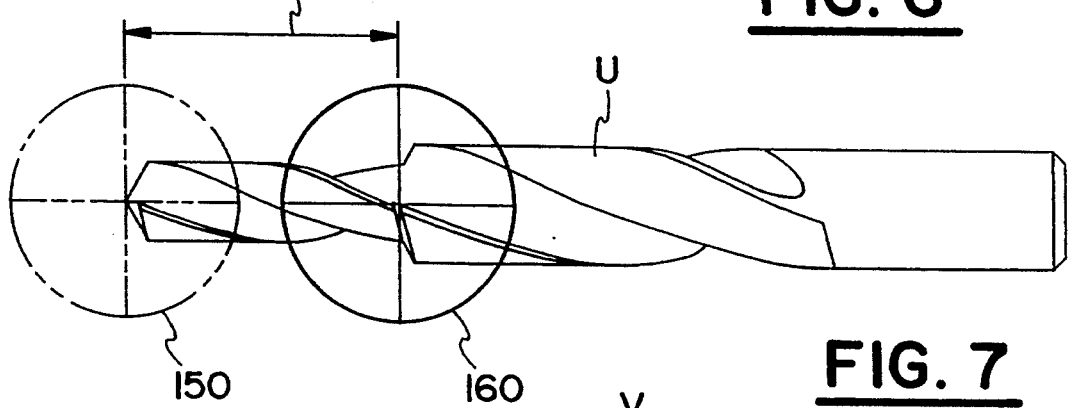
FIG. 7 schematically illustrates a drill bit and the reticle according to the invention as the user determines the step length of a stepped cutting tool.

The step length on a multi-diameter tool U is measured by positioning tool U in the manner generally described above, and aligning the intersection of the cross hairs of the reticle with a first feature, as shown by a starting position 150 in FIG. 7.

Linear measurement device 104 is zeroed by actuating reset button 106. One then moves magnifying device 22 along guide rail 24 until the vertical cross hair V and horizontal cross hair H have been aligned with the second feature of tool U, as shown by a stopped position 160. A step length 162 corresponding to the distance between the first feature and the second feature of tool U is read from readout 108 on linear measurement device 104.

The procedures outlined with respect to FIGS. 1-7 set forth basic steps for determining side view measurements. Variations on the above techniques will allow one to also inspect lip height variation, helix angles, chamfer angles, rake angles, notch angles, and other features of interest.

Figure 8:
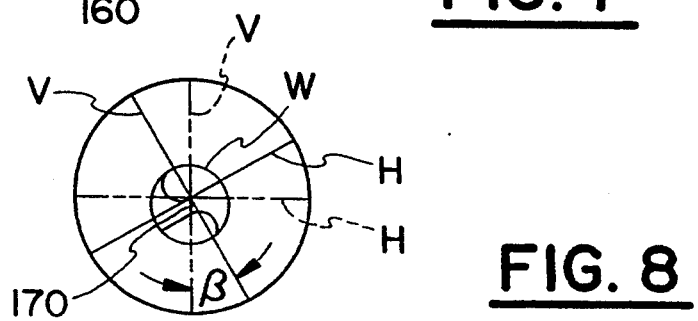
FIG. 8 schematically illustrates the end view of a cutting tool viewed through the reticle according to the invention when measuring the chisel angle thereof.

FIG. 8 shows an example of an end view measurement of the working end of a tool W.

End measurements are taken generally as described above, with tool W generally positioned so that the end to be inspected contacts vertical side window 52.

Alternatively, it is also possible to make end view measurements with the inspection apparatus 10 according to the invention by having the end to be inspected located near to vertical side window 52 with a gap therebetween. The positioning of tool W just short of side window 52 can be accomplished by adjusting sliding tail stock 30 so that tool W makes no contact with vertical side window 52.

Magnifying device 22 is moved into position above horizontal top window 54 so that the image of the end of tool W is reflected by reflective surface 50 toward microscope 22.

In particular, in order to determine a chisel angle β (beta), for example, object focus collar 74 is rotated until a clear end view is seen. As necessary, one moves thumb wheel 112 for repositioning linear measurement device 104 in order to achieve the desired end view. Graduated scale collar 66 is moved and zeroed. Chisel 170 of tool W is aligned with vertical cross hair V. As necessary, traverse linear measurement device 104 until the intersection of cross hairs V and H coincide with the intersection of the cutting edge and chisel 170. The graduated scale collar 66 is rotated until cross hair V coincides with the cutting edge. The measured angle read on graduated scale collar 66 corresponds to chisel angle β (beta).

As will be readily appreciated, using a combination of the above movements of the components of inspection apparatus 10, one can measure web thickness or so-called W2 on split points, primary and secondary chisel angles, notch angles, lip centrality, chisel centrality, and like features.

It is further contemplated that the linear measurement device will be a conventional digital caliper, for example, a digital caliper having a statistical process control (SPC) output.

It is likewise contemplated that a stabilizing element, such as a nylon foot, will be disposed between the magnifying device and the base so the magnifying device will move more smoothly, and the base will not be scratched. It is also expected that set screws or the like be used in place of frictional connections between different elements of the magnifying device or microscope.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A tool inspection apparatus, comprising:
   a) a bed configured for supporting a tool to be inspected;
   b) a magnifying device associated with said bed, said magnifying device being configured for focusing on a plurality of portions of said tool supported by said bed;
   c) a reflecting member associated with said bed, said reflecting member being configured for reflecting an image of at least a first portion of said tool supported by said bed towards said magnifying device; and d) said magnifying device being movable from a reflected image-receiving position to a direct image-receiving position, said reflected image-receiving position being a position in which said magnifying device receives a reflected image of said first portion of said tool reflected by said reflecting member, and said direct image-receiving position being a position in which an image of at least a second portion of said tool supported by said bed is received directly by said magnifying device.

2. A tool inspection apparatus as defined in claim 1, wherein:
   a) said magnifying device includes a microscope.

3. A tool inspection apparatus as defined in claim 1, wherein:
   a) an angular measurement device is associated with said magnifying device.

4. A tool inspection apparatus as defined in claim 1, wherein:
   a) a linear measurement device is associated with said magnifying device.

5. A tool inspection apparatus as defined in claim 4, wherein:
   a) said linear measurement device is substantially directly attached to said magnifying device.

6. A tool inspection apparatus as defined in claim 1, wherein:
   a) said reflecting member includes a prism.

7. A tool inspection apparatus as defined in claim 1, wherein:
   a) said reflecting member includes a mirror.

8. A tool inspection apparatus as defined in claim 1, wherein:
   a) a movable end stop is associated with said bed for at least partially restraining a tool supported on said bed.

9. A tool inspection apparatus, comprising:
   a) means for supporting a tool to be inspected;
   b) means associated with said supporting means for magnifying a plurality of portions of said tool supported by said supporting means;
   c) means associated with said supporting means for reflecting an image of at least a first portion of said tool supported by said supporting means toward said magnifying means; and
   d) said magnifying means being movably positionable for receiving a reflected image of said first portion of said tool supported by said supporting means from said reflecting means when said magnifying means is in a reflected image-receiving position, and said magnifying means receiving a direct image of a second portion of said tool supported by said supporting means when said magnifying means is in a direct image-receiving position.

10. A tool inspection apparatus as defined in claim 9, wherein:
    a) said reflected image-receiving position of said magnifying means is disposed at a distance from said direct image-receiving position thereof.

11. A tool inspection apparatus as defined in claim 9, wherein:
    a) said magnifying means includes a magnifying lens.

12. A tool inspection apparatus as defined in claim 9, wherein:
    a) means is provided for measuring angles of at least one of said portions of said tool supported by said supporting means.

13. A tool inspection apparatus as defined in claim 9, wherein:
    a) means is provided for measuring linear distances of at least one of said portions of said tool supported by said supporting means.

14. A tool inspection apparatus as defined in claim 13, wherein:
    a) said linear distance measuring means is directly attached to said magnifying device.

15. A tool inspection apparatus as defined in claim 9, wherein:
    a) said supporting means includes a bed;
    b) a linear groove is defined in said bed, said linear groove being configured for restraining said tool; and
    c) a transverse groove is defined in said bed, said transverse groove opening into said linear groove, and said transverse groove being configured for receiving a finger of a user of said apparatus for allowing said user to access and to move said tool received in said linear groove.

* * * * *